United States Patent [19]

Bellinghausen et al.

[11] Patent Number: 5,667,759
[45] Date of Patent: Sep. 16, 1997

[54] METHOD FOR MANUFACTURING ALKALI CHROMATES FROM CHROMIUM ORE

[75] Inventors: Rainer Bellinghausen, Köln; Heinrich Helker, Krefeld; Paul Strehlow, Leverkusen; Hans-Heinrich Moretto, Leverkusen; Bernhard Spreckelmeyer, Leverkusen; Norbert Lönhoff, Leverkusen; Michael Batz, Leichlingen; Rainer Weber, Odenthal; Hans Rinkes, Köln; Hans-Dieter Block, Leverkusen, all of Germany; Uwe Arndt, Zarate/Buenos Aires, Argentina

[73] Assignee: Bayer Aktiengesellschaft, Leverkusen, Germany

[21] Appl. No.: 690,420

[22] Filed: Jul. 26, 1996

Related U.S. Application Data

[63] Continuation of Ser. No. 310,467, Mar. 22, 1994, abandoned.

[30] Foreign Application Priority Data

Sep. 30, 1993 [DE] Germany .................. 43 33 349.4

[51] Int. Cl.$^6$ .................................................. C01G 37/00
[52] U.S. Cl. .................................................. 423/61; 423/596
[58] Field of Search ..................... 423/61, 596; 266/173

[56] References Cited

U.S. PATENT DOCUMENTS

| 2,091,850 | 8/1937 | Gohre .................. 266/173 |
| 4,373,909 | 2/1983 | Petit et al. ............ 266/173 |
| 4,469,509 | 9/1984 | Fischer et al. ......... 266/173 |

FOREIGN PATENT DOCUMENTS

| 1352978 | 5/1974 | United Kingdom . |
| 1359849 | 7/1974 | United Kingdom . |
| 9117118 | 11/1991 | WIPO . |
| 91-17118 | 11/1991 | WIPO ............... 423/596 |

*Primary Examiner*—Steven Bos
*Attorney, Agent, or Firm*—Sprung Horn Kramer & Woods

[57] ABSTRACT

A method for the decomposition of chromium ore in a directly heated revolving tube is described, in which oxygen-containing gases are introduced into the revolving tube by means of below-bed nozzles.

1 Claim, 3 Drawing Sheets

METHOD FOR MANUFACTURING ALKALI CHROMATES FROM CHROMIUM ORE

This application is a continuation of application Ser. No. 08/310,467, filed on Sep. 22, 1994 which is now abandoned.

The present invention relates to a method for manufacturing alkali chromates by the reacting of chromium ore with alkali compounds and oxidation with oxygen-containing gases.

BACKGROUND OF THE INVENTION

It is known to react chromium ore by roasting with alkali compounds, optionally in the presence of leaning materials, to alkali chromates at temperatures of 900° to 1100° C. The reacting takes place conventionally in revolving tubular kilns heated directly by means of hot flame gases. The reaction proceeds, depending on the alkali compound used, mainly according to the following overall reaction equations (1), (2) and/or (3):

$$4\ FeCr_2O_4 + 8\ Na_2CO_3 + 7\ O_2 \rightarrow 8\ Na_2CrO_4 + 2\ Fe_2O_3 + 8\ CO_2 \quad (1)$$

$$4\ FeCr_2O_4 + 16\ NaOH + 7\ O_2 \rightarrow 8\ Na_2CrO_4 + 2\ Fe_2O_3 + 8\ H_2O \quad (2)$$

$$4\ FeCr_2O_4 + 16\ NaHCO_3 + 7\ O_2 \rightarrow 8\ Na_2CrO_4 + 2\ Fe_2O_3 + 16\ CO_2 + 8\ H_2O \quad (3)$$

A limiting factor for the rate of reaction and hence the space-time yield, if the reaction is carried out on a large industrial scale, is the rate of access of the oxygen to the reaction mixture consisting of chromium ore, alkali compounds and optionally leaning materials.

On the one hand the oxygen content of the kiln atmosphere resulting from the mixing with the flame gases of the direct heating is in general limited to only 8 to 12%. On the other hand the reaction mixture releases $CO_2$ and/or water vapour, which escapes out of the bed of the reaction mixture in counter-flow to the oxygen from the kiln atmosphere.

In order to increase the rate of reaction it has already been proposed according to U.S. Pat. No. 3,733,389 that oxygen be supplied additionally at the outlet end of the revolving tube (outlet of the reaction mixture) via nozzles directed onto the bed surface. This measure has proved to be not very effective, since the additionally supplied oxygen is drawn and discharged through the kiln mainly in the form of streaks together with the flue gases.

SUMMARY OF THE INVENTION

According to the invention it is now proposed that oxygen-containing gas be injected into the bed of the reaction mixture by means of below-bed nozzles. In this way on the one hand oxygen is supplied to the whole bed volume and on the other simultaneously $CO_2$ and/or water vapour produced in the bed volume is expelled out of the bed after consumption of the oxygen together with residual gases, so that effective contact between the reaction mixture and oxygen is ensured.

The present invention consequently provides a method for manufacturing alkali chromates by the reacting of chromium ore with alkali compounds, optionally in the presence of leaning materials, and oxidation with oxygen-containing gases in a directly heated revolving tube at temperatures of 850° to 1150 ° C., which is characterised by the fact that there is injected into the bed of the reaction mixture obtained from chromium ore and alkali compounds and optionally leaning materials at least a part of the oxygen-containing gases.

Preferably the injection takes place via gas supply nozzles ("below-bed nozzles") arranged on at least one peripheral line in a plane normal to the revolving tube axis and passing through the revolving tube surface. Particularly preferably the injection takes place in the vicinity of the exit of the reaction mixture out of the revolving tube, in particular in the last third of the revolving tube.

On a peripheral line normal to the revolving tube axis there can moreover be provided 6 to 20 uniformly distributed below-bed nozzles. Preferably the latter are loaded with oxygen-containing gases via valve controls in such a way that oxygen is injected only via those below-bed nozzles which are layered with reaction mixture on their exit side on the inner wall of the revolving tube.

The injection of oxygen-containing gases can preferably take place via 3 to 10, preferably 3 to 5, peripheral lines arranged with the same spacing and provided with below-bed nozzles, which are all arranged in the last third, preferably in the last quarter, of the revolving tube.

There are suitable as oxygen-containing gases air or air enriched with oxygen or pure oxygen. The whole of the oxygen injected must as far as possible not exceed the oxygen required stoichiometrically for the decomposition reaction according to equations (1), (2) and (3) represented in the preamble. Depending on the oxygen content of the kiln atmosphere, which also contributes to the oxidation, the amount of oxygen injected can be reduced. In particular it is not necessary according to the invention to supply the kiln atmosphere with additional oxygen-containing gases in order to increase the oxygen content. In particular it is possible according to the invention to operate with in the main oxygen-free atmosphere if the whole of the oxygen required for the oxidation of the reaction mixture is supplied via below-bed nozzles.

In order to prevent the optimal reaction temperature being fallen below, the oxygen-containing gas can be pre-heated or suitably allowed for when setting the temperature of the kiln material mixture.

The selection of the oxygen-containing gas, i.e. of its oxygen concentration, is with expediency chosen as a function of the nature of the heap of the reaction mixture. In smaller revolving tubular kilns with diameters of 1 to 2 meters and corresponding bed thicknesses of the reaction mixture of 20 to 50 cm a gas with high oxygen content is preferably used in order to prevent the formation of channels in the bed heap, which promote an unconsumed passage of the oxygen-containing gas through the heap into the kiln atmosphere. In revolving tubular kilns with very large inner diameter, e.g. 3 to 5 meter, it may be expedient to inject oxygen-containing gases with low oxygen content, e.g. air or air enriched only up to 50% oxygen content, in order to bring about, through the content in non-reacting gas, additional loosening of the reaction mixture or a partial channel formation in the mixture, so that the bulk volume is penetrated more uniformly by the oxygen-containing gas.

There are used as chromium ore ores with a $Cr_2O_3$ content of 40 to 47 wt %, which contain as further constituents iron oxide, aluminium oxide and magnesium oxide, together with small proportions of silicon dioxide and other constituents of natural minerals typically in amounts of less than 1 wt %.

In particular soda is used as alkali compound.

The addition of leaning materials to the reaction mixture serves to prevent granulation of the reaction due to intermediately forming liquid phases. There are used conventionally as leaning materials quick lime or in particular so-called recycled ore, i.e. the water-insoluble slag remaining after leaching of the alkali chromate out of the reaction mixture leaving the revolving tubular kiln. Leaning materials are preferably used in amounts of 50 to 150 wt %, referred to the ore content of the mixture.

Chromium ore, soda and leaning material are fed to the revolving tubular kiln after grinding to particle sizes below 300 µm, preferably below 60 µm, after mixing.

As a result of the feeding according to the invention of oxygen-containing gases by means of below-bed nozzles, it is possible to increase the capacity of existing revolving tubular kilns after fitting with below-bed nozzles by 30 to 50%. In general the amount of leaning material required to maintain the flowability of the reaction mixture can in addition be sharply reduced, so that the revolving tubular kiln capacity referred to ore is further increased.

BRIEF DESCRIPTION OF THE DRAWINGS

The present invention will be explained in detail by means of the attached figures:

Identical symbols in the various figures refer to mutually corresponding elements, unless stated otherwise.

FIG. 1 shows a revolving tubular furnace 1, which is supported on driven rollers 2, so that it rotates about the axis 3.

Figure 1:
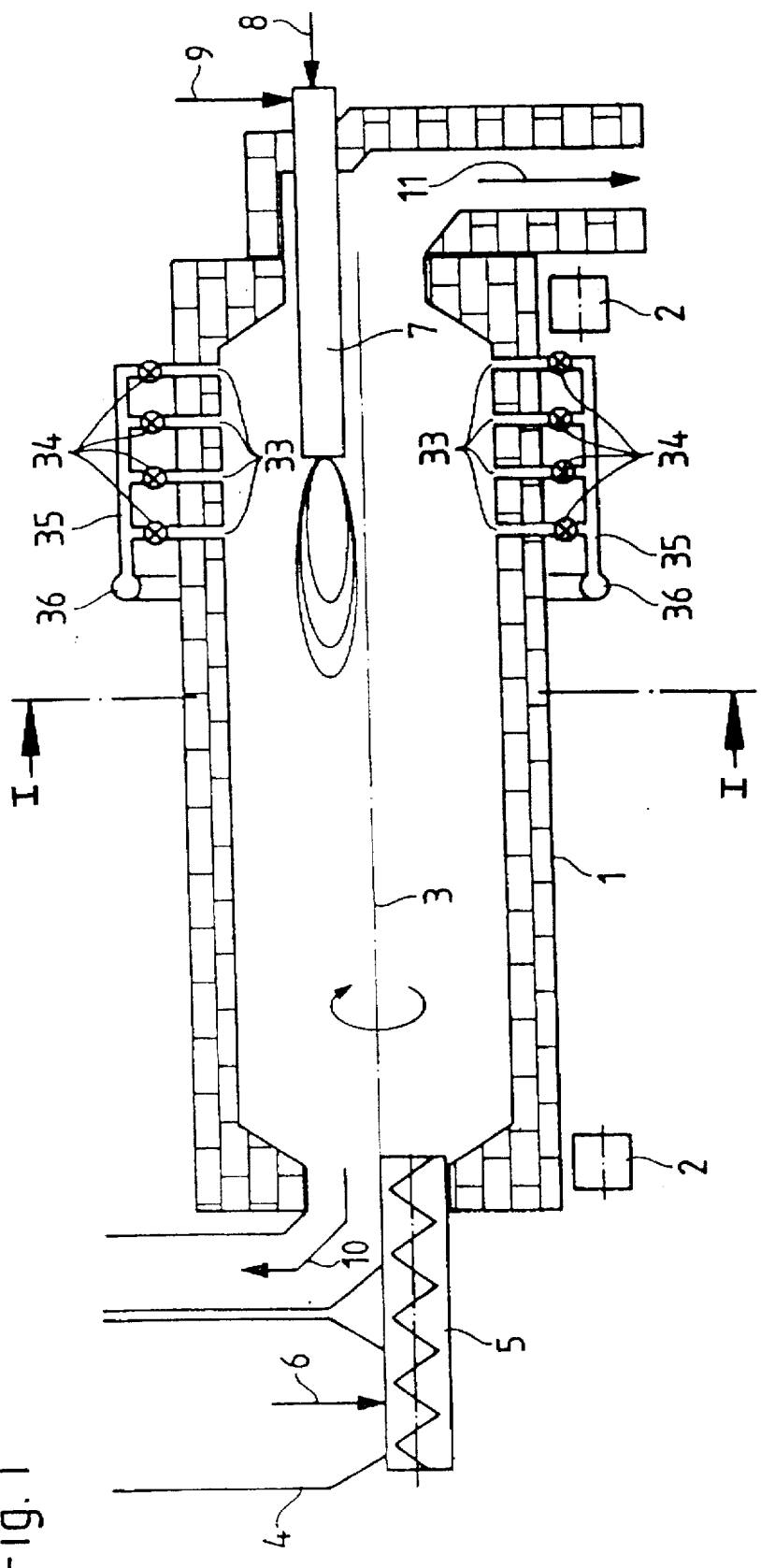
FIG. 1 shows a paraxial section through an apparatus for carrying out the invention.

From a silo 4 the revolving tube 1 is loaded continuously with the decomposition mixture via a worm 5 in the direction of the arrow 6. The heating of the revolving tube 1 takes place by means of burner 7, to which, indicated by arrows, fuel 8 and combustion air 9 are fed. The flue gases and released $CO_2$ leave the revolving tubular kiln along arrow 10. Sodium chromate-containing slag exits from the revolving tube as decomposition product along arrow 11 and is fed to a water bath (not shown) for the leaching of the sodium chromate.

The feeding of oxygen-containing gases takes place by means of below-bed nozzles 33 arranged on the generated surface of the revolving tube 1. The below-bed nozzles 33 are supplied by paraxial supply lines 35 and a circular pipe-line 36 arranged around the revolving tube axis 3.

The valves 34, which connect the below-bed nozzles 33 to the supply lines 35, are so controlled that oxygen is fed only if the respective below-bed nozzle is covered with decomposition mixture. Preferably only so much oxygen is supplied as is consumed during the passage through the decomposition mixture.

Figure 2:
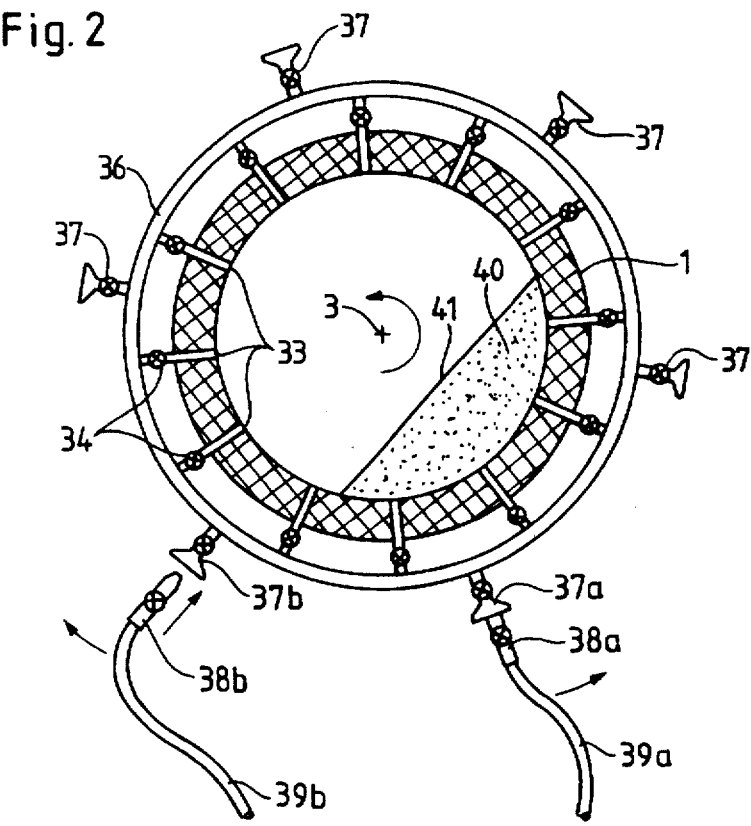
FIG. 2 shows a cross-section I—I through the apparatus according to FIG. 1.

FIG. 2 shows a section I—I through the revolving tube according to FIG. 1.

The supplying of the below-bed nozzles 33 with oxygen takes place via a circular pipeline 36 connected firmly to the revolving tube surface, i.e. rotating together with it, via connecting lines 35 (FIG. 1) and valves 34.

The circular pipeline 36 comprises contact valves 37 distributed over the periphery, to which flexible lines 39a and 39b can be connected by means of contact valves 38a and 38b. At least one of the valves 38a and 38b is connected alternately to one of the valves 37 (here 37a) and is carried along by the circular pipeline 36 rotating with the revolving tube to such an extent as the flexible line 39a permits. The respective valve connection is slackened by manipulators (not shown), the valve 38 (here 38b) is moved back against the direction of rotation of the revolving tube and connected to the next available valve 37 (here 37b).

Figure 3:
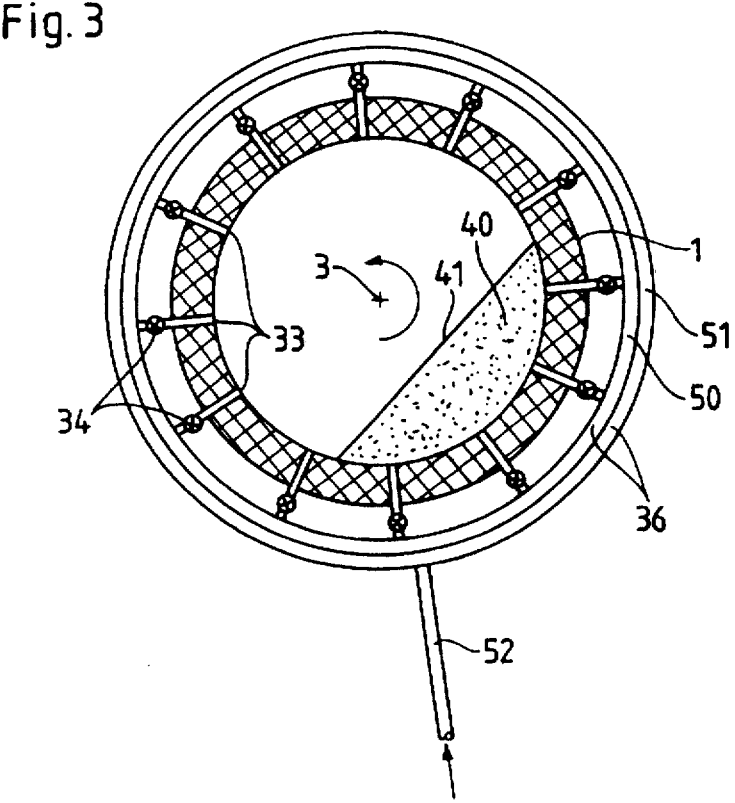
FIG. 3 shows an alternative to the construction according to FIG. 2.

As an alternative to the feeding of the oxygen-containing gas via a circular conduit 36 with contact valves 37 shown in FIG. 2, the circular conduit 36 can be formed as a sliding circular conduit (FIG. 3), which consists of two concentrically formed half shells 50 and 51, of which the one half shell 50 is connected firmly to the revolving tube surface 1 and rotates with it about the revolving tube axis and the other half shell 51 is arranged stationary and is fed via a gas supply line 52 connected rigidly to the latter. Half shell 50 is sealed against half shell 51 by sliding seal elements (not shown).

Figure 4:
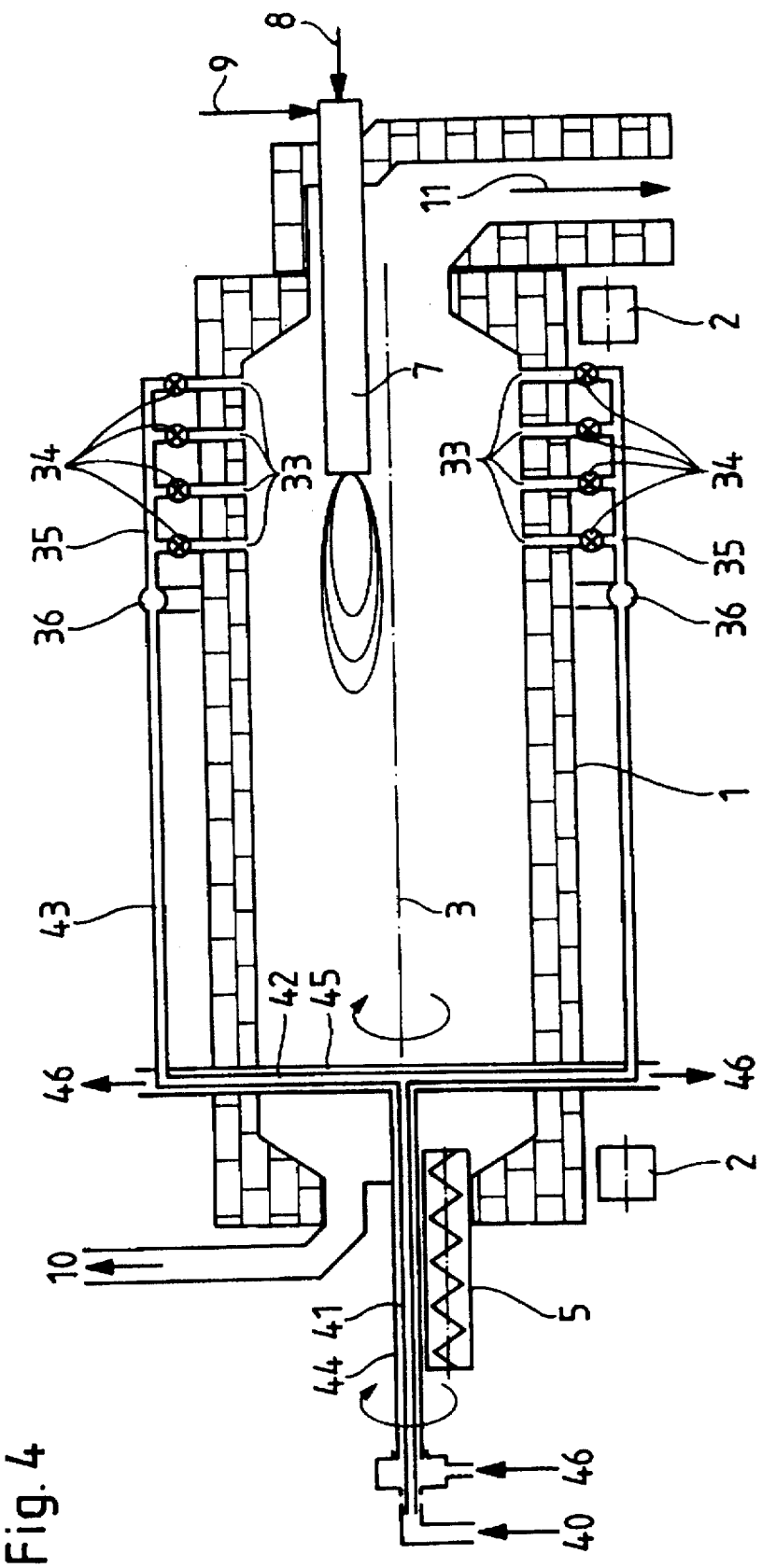
FIG. 4 shows an arrangement like FIG. 1, but with alternative layout of the oxygen supply to the below-bed nozzles.

According to an alternative embodiment of the method according to the invention (FIG. 4) the oxygen-containing gas 40 is supplied to the circular pipeline 36 via a feed pipe 41 arranged in the axis of the revolving tube, which is passed to the outside out of the inside of the revolving tube via line 42 and then runs on the outside of the revolving tube surface along 43. In order to avoid overheating of the gas pipe 42 the latter is provided with a concentric pipe 44 and 45, through which a cooling gas 46, e.g. ambient air, is pumped.

We claim:

1. A method for manufacturing alkali chromates by the oxidative roasting of a mixture of chromium ore with alkali compounds, optionally in the presence of leaning materials, in a directly heated revolving tube at temperatures of 850° to 1,150° C., wherein oxygen-containing gases are injected through the wall of the revolving tube and into said mixture.

* * * * *

UNITED STATES PATENT AND TRADEMARK OFFICE
CERTIFICATE OF CORRECTION

PATENT NO. : 5,667,759
DATED : September 16, 1997
INVENTOR(S) : Bellinghausen, et al.

It is certified that error appears in the above-indentified patent and that said Letters Patent is hereby corrected as shown below:

Title Page  Related U.S. Application Data [63]:  After
" 310,467, " delete " Mar. 22, 1994 " and
substitute -- Sep. 22, 1994 --

Signed and Sealed this

Seventeenth Day of February, 1998

Attest:

BRUCE LEHMAN

*Attesting Officer*       *Commissioner of Patents and Trademarks*